(12) United States Patent
Dinda et al.

(10) Patent No.: US 7,991,831 B2
(45) Date of Patent: Aug. 2, 2011

(54) SYSTEM AND METHOD FOR SPECULATIVE REMOTE DISPLAY

(75) Inventors: Peter Dinda, Evanston, IL (US); Sam Rossoff, New York, NY (US)

(73) Assignee: Northwestern University, Evanston, IL (US)

( * ) Notice: Subject to any disclaimer, the term of this patent is extended or adjusted under 35 U.S.C. 154(b) by 947 days.

(21) Appl. No.: 11/830,553

(22) Filed: Jul. 30, 2007

(65) Prior Publication Data

US 2010/0030842 A1    Feb. 4, 2010

(51) Int. Cl.
*G06F 15/16* (2006.01)
(52) U.S. Cl. .............................. 709/203; 709/224; 702/3
(58) Field of Classification Search .................. 709/203, 709/224; 702/3
See application file for complete search history.

(56) References Cited

U.S. PATENT DOCUMENTS

| | | | |
|---|---|---|---|
| 2002/0092029 A1 | 7/2002 | Smith | |
| 2002/0107638 A1* | 8/2002 | Intriligator et al. | 702/3 |
| 2003/0084094 A1 | 5/2003 | Shim et al. | |
| 2003/0225883 A1 | 12/2003 | Greaves et al. | |
| 2004/0172340 A1 | 9/2004 | Bishop et al. | |
| 2005/0108322 A1* | 5/2005 | Kline et al. | 709/203 |
| 2005/0273830 A1 | 12/2005 | Silver et al. | |
| 2006/0200258 A1 | 9/2006 | Hoffberg et al. | |

OTHER PUBLICATIONS

"Prospects for Speculative Remote Display"—Technical Report posted at http://www.eecs.northwestern.edu/research/tech_reports/number/ (Aug. 8, 2006).

* cited by examiner

*Primary Examiner* — Kyung-Hye Shin
(74) *Attorney, Agent, or Firm* — McAndrews, Held & Malloy, Ltd.

(57) ABSTRACT

Certain embodiments of the present invention provide for a system and method for network computing. In an embodiment, the system may include a storage unit for archiving historical user events and historical server events. The system may also include a processing unit for receiving a current user event and generating one or more predicted server events. The processing unit may execute a screen update based on the one or more predicted server events. The system may also include a comparison unit having computer software for comparing one or more predicted server events with one or more server-supplied server events. The one or more server-supplied server events may be generated based on the current user event. In an embodiment, the system also includes an undo unit having computer software for executing an undo algorithm. The undo unit alters the non-matching events to match the server-supplied server events.

28 Claims, 5 Drawing Sheets

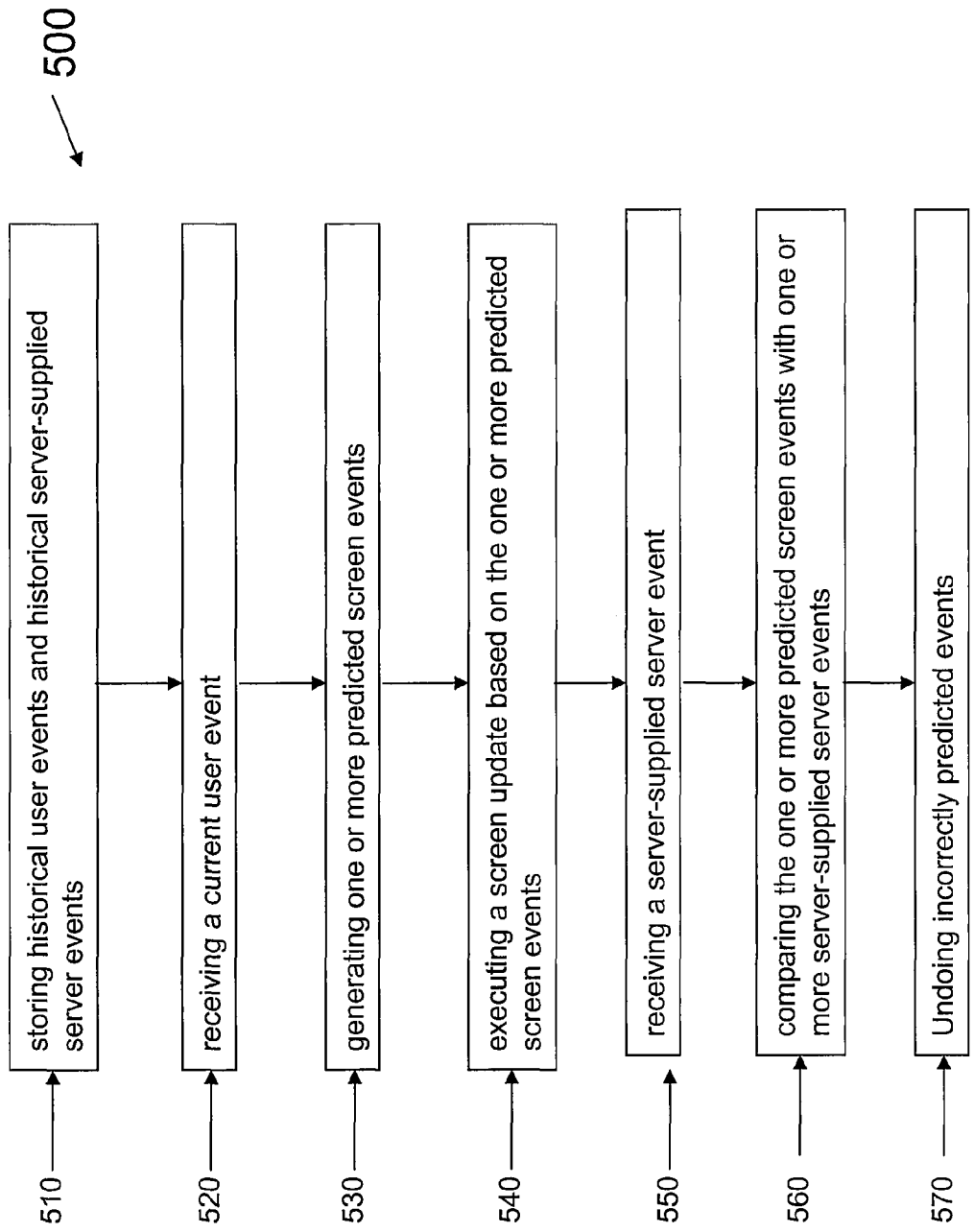

SYSTEM AND METHOD FOR SPECULATIVE REMOTE DISPLAY

FEDERALLY SPONSORED RESEARCH OR DEVELOPMENT

This invention was made with government support under Grant Nos. ANI-0093221 and EIA-0224449 awarded by the National Science Foundation. The government has certain rights in the invention.

RELATED APPLICATIONS

[Not Applicable]

MICROFICHE/COPYRIGHT REFERENCE

[Not Applicable]

BACKGROUND OF THE INVENTION

The present invention generally relates to a system and method for improving the responsiveness of network computer systems. Particularly, the present invention relates to a system and method for an improved client in a network computer system that predicts server events and applies the predicted server events as screen updates prior to receiving server-supplied events.

Remote display systems allow a distant user to control a computer or application with a graphical user interface as if the user were physically in front of the machine. In general, the basic model includes a client computer and a server computer. The client computer is generally the computer where the user is located. The client computer streams user events, such as keystrokes, mouse movements, or other input to the server computer over a network connection. The server streams server events, for example drawing commands, back to the client. In general, the server streams server events back to the client using either a client-pull model or a server-push model. The client, once it receives the server events, executes a screen update to modify the screen that the user sees.

FIG. 1 illustrates an example of a conventional remote display system 100. The client 110 may be a user's computer. The client 110 may be connected to a display screen, keyboard, computer mouse, or other input/output devices. The client 110 may also include a cache 120. The cache 120 may be implemented separately or as part of a frame buffer. The cache 120 may also be implemented in software or in hardware. The client 110 may receive user events 130, such as input from a keyboard, computer mouse, or other input device, and communicate the user events 130 over a network to a server 140. The server 140 may process the user events 130 and communicate server events 150 back to the client 110. The server events 150 may include drawing commands, bitmaps, color tables, blit operations, ordering operations, or other display commands. The client 110 receives the server events 150 and displays an updated screen for the user.

Increasingly, remote display systems, such as the system 100 demonstrated in FIG. 1, are being used over wide-area networks. Wide-area-networks, such as the Internet, have much higher latency time frames and variance than those in local-area networks. The higher latencies and variance dramatically reduce the utility of remote display systems for end-users. The high latencies and/or the variance of latency make the server computer seem choppy, slow, and hard to control from the perspective of the client and the user.

As demonstrated in FIG. 1, the client computer 110 and server computer 140 in a remote display system 100 generally communicate through two independent event streams. User events such as keystrokes, mouse movements and clicks, and other input flow from the client 110 to the server 140. Server events, such as graphics primitives flow from the server 140 to the client 110. In general, remote display systems do not require that the user event stream 130 and the server event stream 150 be synchronized. However, the two event streams are often synchronized through the user who may frequently wait for the effects of his actions to be shown on the display. The user is thus subject to the round-trip time of the network path. The user thus perceives the high mean latency and/or variance of latency of the network path as slowness and/or jitter in the display.

Therefore, a system and method is needed to increase the utility of a remote display system over a wide-area-network. Such a system and method may provide a faster, more efficient user experience than is available when using current remote display systems.

SUMMARY OF THE INVENTION

Certain embodiments of the present invention may include a system for network computing. The system may include a storage unit for archiving historical user events and historical server events. The system may also include a processing unit for receiving a current user event and generating one or more predicted server events. The processing unit executes a screen update based on the one or more predicted server events. The system may also include a comparison unit having computer software for comparing the one or more predicted server events with one or more server-supplied server events. The one or more server-supplied server events are generated based on a triggering event. In an embodiment, for example, the triggering event may be the current user event, an interval of time, or the server-supplied server event. The system may also include an undo unit. If there is a difference between the one or more predicted server events and the one or more server-supplied server events, an undo unit having computer software for executing an undo algorithm alters the non-matching events to match the server-supplied server event. Alternatively, if the difference between the one or more predicted server events and the one or more server-supplied server events is greater than a threshold value, an undo unit having computer software for executing an undo algorithm alters the non-matching events to match the server-supplied server event. In an embodiment, the storage unit, the processing unit, and the comparison unit are located in an intermediate device. In an embodiment, the storage unit, the processing unit, and the comparison unit are located in a client. A mirror storage unit, mirror processing unit, and mirror comparison unit may be located in a server and the server transmits to the client error correction information.

Certain embodiments of the present invention may include a method for network computing. The method may include storing historical user events and historical server events. The method may also include receiving a current user event and generating one or more predicted server events. The method may also include executing a screen update based on the one or more predicted server events. The method may also include comparing the one or more predicted server events with one or more server-supplied server events. The one or more server-supplied server events are generated based on a triggering event. In an embodiment, for example, the triggering event may be the current user event, an interval of time, or the server-supplied server event. The method may also include undoing one or more of the predicted server events executed as part of the screen update using an undo algorithm if one or more of the predicted server events are different than the one or more server-supplied server events. The one or more predicted server events are may be generated according to one or more of the following: predicted user events, historical user events, historical predicted server events, historical server-supplied server events. The undo algorithm may include an undo-logging algorithm, a redo-logging algorithm, an undo algorithm that requests a refresh of information from a server. In an embodiment, the request of information may be at periodic updates. In an embodiment, the undo algorithm identifies the last periodic update and then executes a redo-logging algorithm. In an embodiment, the undo algorithm identifies the incorrect region on the display to the user. In an embodiment, the undo algorithm identifies the incorrect region on the display to the user using an alpha mask.

Certain embodiments of the present invention may include a computer readable medium including a set of instructions for execution by a computer. The set of instructions may include a storage routine for storing historical user events and historical server events. The set of instructions may also include a receiving routine for receiving a current user event. The set of instructions may also include a generating routine for generating one or more predicted server events. The set of instructions may also include an execution routine for executing a screen update based on the one or more predicted server events. The set of instructions may also include a comparison routine for comparing one or more predicted server events with one or more server-supplied server events, wherein one or more server-supplied server event is generated based on a triggering event. In an embodiment, for example, the triggering event may be the current user event, an interval of time, or the server-supplied server event. The set of instructions may also include an undo routine for executing an undo algorithm if one or more predicted server events is different than one or more server-supplied server events. The set of instructions may also include a generating routine for receiving one or more of the following: predicted user events, historical user events, historical predicted server events, historical server-supplied server events. In an embodiment, the generating routine is using a k-th order state-space-limited Markov model.

BRIEF DESCRIPTION OF THE DRAWINGS

FIG. 5 illustrates a method for network computing in accordance with an embodiment of the present invention.

Figure 1:
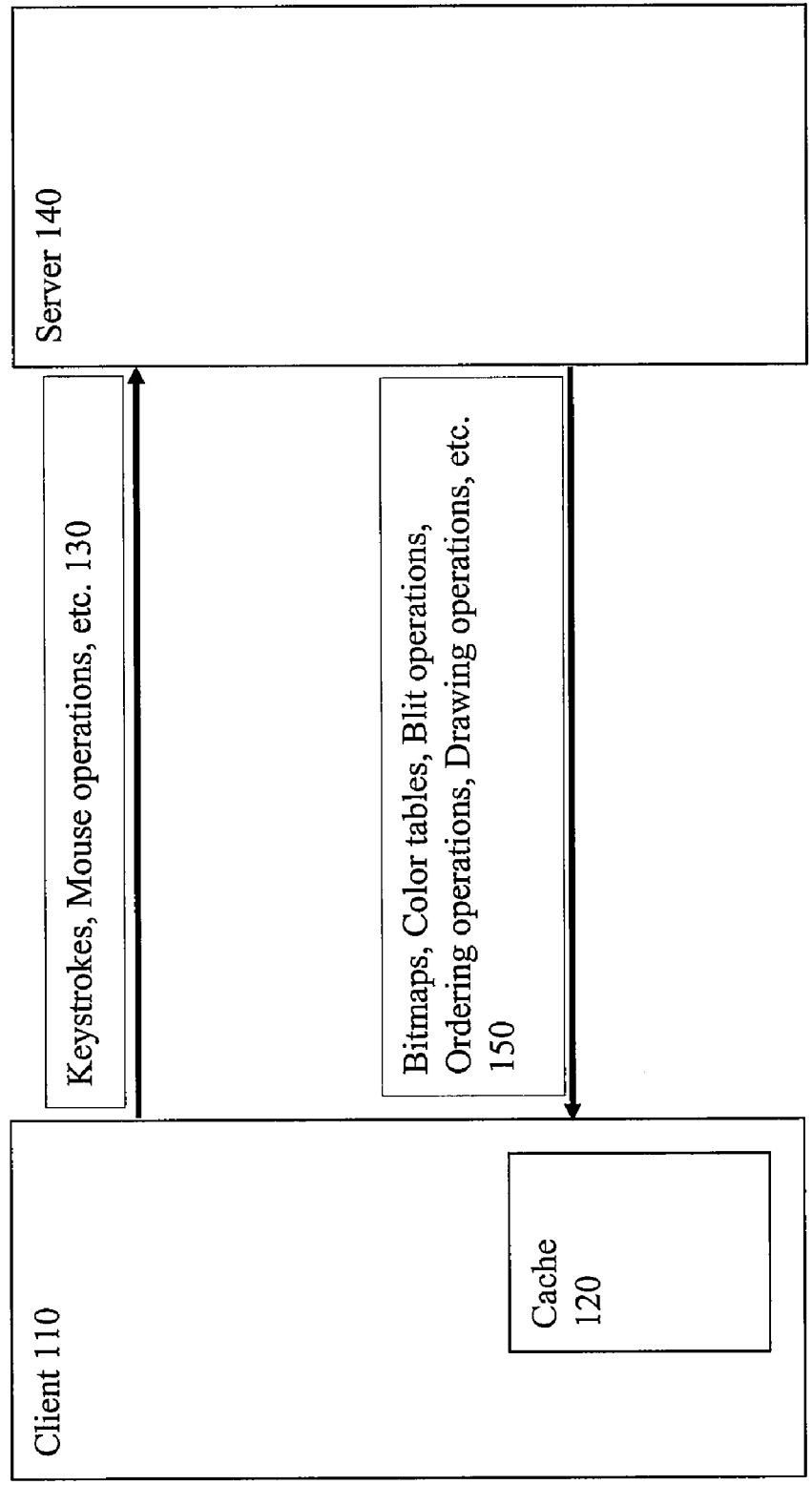
FIG. 1 illustrates an example of a conventional remote display system.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Figure 2:
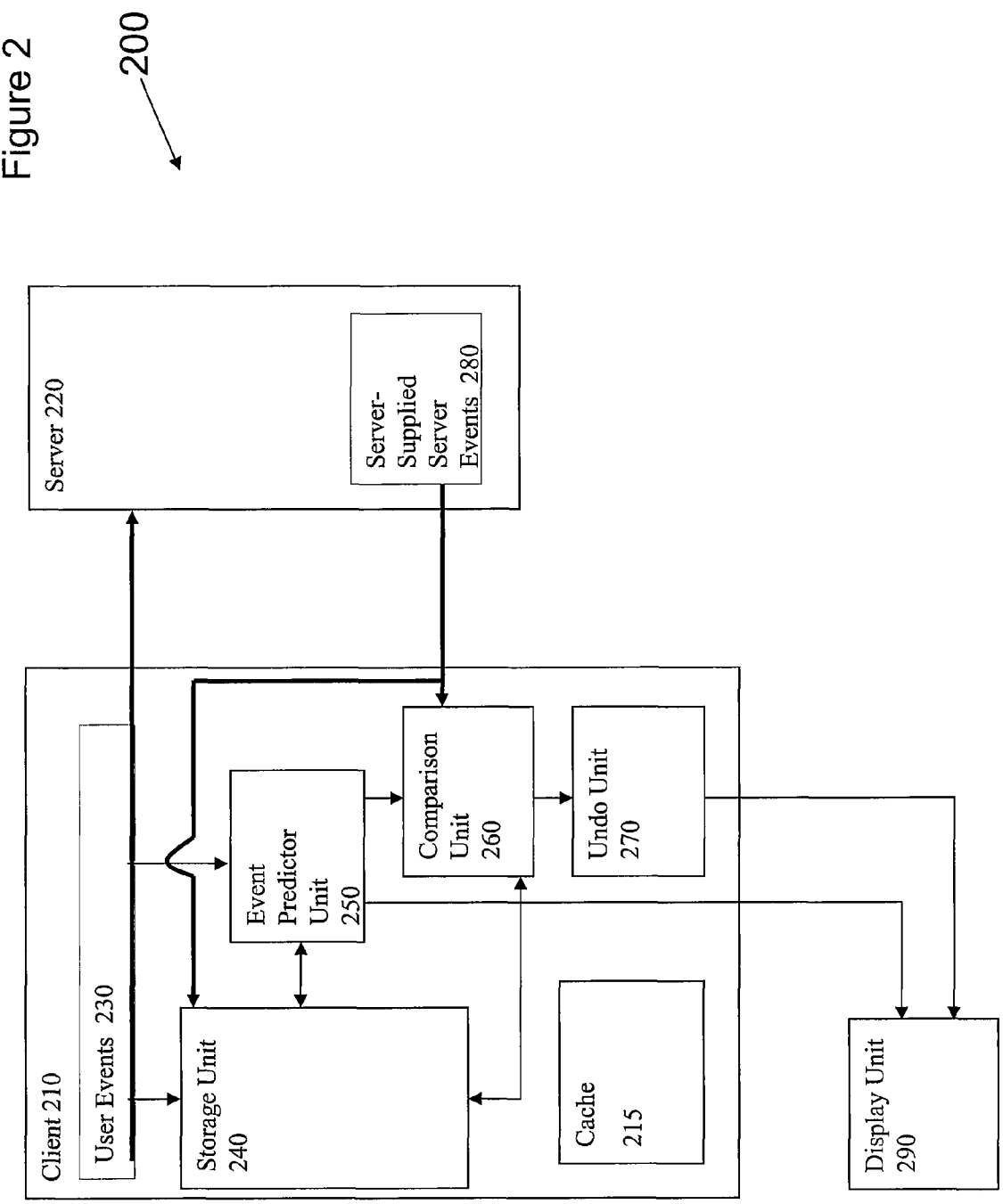
FIG. 2 illustrates a remote display system that may be used in accordance with an embodiment of the present invention.

FIG. 2 illustrates a remote display system 200 that may be used in accordance with an embodiment of the present invention. In an embodiment, the system 200 may be a remote display system or a system for network computing. The system 200 illustrates a client computer 210 and a server computer 220. The client computer 210 and server computer 220 are in communication with each other through a network. The network may be, for example, the Internet. The client computer 210 may receive current user events 230. The current user events 230 may include user input signals from a keyboard, computer mouse, voice commands, or other input commands. As in the remote display system of FIG. 1, the current user events 230 are communicated to the server computer 220 via the network. The system 200 also includes a cache 215. The cache 215 may be implemented separately or as part of a frame buffer. The cache 215 may also be implemented in software or in hardware.

In the remote display system 200, however, the current user events 230 are also communicated to a storage unit 240. The storage unit 240 receives the current user events 230 and stores the current user events in a memory. The storage unit 240 also stores historical information regarding the user events, the predicted server events, and the server-supplied server events. In an embodiment, the user events may include input from a keyboard, computer mouse, or other input device for a computer. The server events may include drawing commands, bitmaps, color tables, blit operations, ordering operations, or other display commands. A historical user event is a user event that has previously occurred. A predicted user event is a user event that is generated by the client and is a prediction of the user event. A historical server event is a server event that has previously occurred. In addition, a server event may be a predicted server event or a server-supplied server event. A predicted server event is generated by the client and is a prediction of the server-supplied server event. The server-supplied server event is generally a server event that is communicated from a server in a remote display system. The historical user events, historical predicted server events, predicted user events and historical server-supplied server events may be stored in storage unit 240. In addition, current user events, predicted server events, and server-supplied server events may also be stored in storage unit 240.

In the system 200, the current user events 230 are also communicated to an event predictor unit 250. A current user event is a user event that has occurred in real-time or near real-time and has not yet caused a screen update. For example, a current user event may include the navigation of a computer mouse and a click one of the computer mouse buttons. In an embodiment, the results of the current user event have not yet been displayed on the screen.

The event predictor unit 250 receives the current user events 230. The event predictor unit 250 is in communication with the storage unit 240. In an embodiment, the event predictor unit 250 utilizes one or more of the historical user events, historical server events, predicted user events and predicted server events to generate a predicted server event. For example, the event predictor unit 250 may utilize any of the historical user events, historical server events, predicted user events and predicted server events individually to generate a predicted server event. In another example, the event predictor unit 250 utilizes any combination of the historical user events, historical server events, predicted user events and predicted server events to generate a predicted server event. In general, the more inputs the event predictor unit utilizes, the more accurate the predictions of the event predictor unit 250 will be. The event predictor unit 250 may also predict user events based on one or more of the historical user events, historical server events, predicted user events and predicted server events. In an embodiment, the event predictor unit 250 may predict as many events as possible within the round-trip time between the client and the server. In addition, a current user event 230 may generate a single predicted server event or multiple predicted server events. Alternatively, the triggering event to generate a server-supplied server event may be an interval of time or a prior server-supplied server event.

The event predictor unit 250 may utilize a prediction algorithm. In an embodiment, the event predictor unit 250 may utilize a k-th order state-space-limited Markov model that is continuously trained as the prediction algorithm. A person of ordinary skill in the art generally understands the functionality of a Markov model and other prediction algorithms. The symbols that the Markov model may utilize are the current user events supplied as human-readable strings. A typical current user event, such as computer mouse movement, contains the type of event, for example, mouse movement and its parameters, for example (x, y) coordinates. In an embodiment, a state may be defined as the concatenation of the last k symbols and the current state of the model is the concatenation of the last k events.

The state space may be limited to the top 1000-2000 most common states ($1000^2$ to $2000^2$ transitions). This limitation may be sufficient to predict at least the next event almost 50% of the time. The number of events predicted may be a parameter that is set to match the typical number of events per network round-trip time. The limit on the number of states can be varied to tradeoff between the amount of memory needed and the effectiveness of the system. In an embodiment, a user may control the tradeoff between memory and effectiveness. For example, a user may control the value of the parameter "k". As "k" is increased, more memory may be used, but the effectiveness of the system may increase. The user may also control the size of the state space. The larger the state space, the more effective the system. The user may also control the number of events in the future that may be predicted. The farther into the future the event predictor 250 attempts to predict, the more display artifacts may exist. In an embodiment, each predicted event includes a corresponding likelihood of correctness, which may be compared against a user-set threshold to determine whether the predicted event should be used.

In an embodiment, continuous model fitting and prediction may be used. The prediction algorithm may operate on a stream of symbols and update the model on each new symbol and supply a prediction of the symbol that is most likely to occur next. If there is insufficient information, then the predictor does not attempt to predict the next state.

The event predictor unit 250 may utilize other prediction models. For example, the event predictor unit 250 may use semantics-free predictors that operate on strings without any knowledge of content. For example, the event predictor unit 250 may utilize a genetic programming model. In addition, the event predictor unit 250 may use semantic-exploiting predictors that take advantage of content. For example, a Markov model may be used to predict the type of event, for example to draw a bit map operation. A linear model, such as Box-Jenkins or nonlinear model, such as Tong, may be used to predict the event parameters, for example the coordinates at which the bitmap should be drawn.

Once the event predictor unit 250 generates a predicted server event, the predicted server event is communicated to the display unit 290. The predicted server event is displayed as part of a screen update. In such a manner, the client 210 predicts future server events from the history of past screen and user events. The predicted server events are executed as part of a screen update, ideally prior to receiving the server-supplied server events.

As shown in FIG. 2, the predicted server event is also communicated to a comparison unit 260. The comparison unit 260 also receives the server-supplied server events 280. The comparison unit 260 compares the predicted server event and the server-supplied server event 280. The server-supplied server events 280 are compared against the predicted server events that have already been executed. In an embodiment, if any of the predicted server events do not match the server-supplied server events 280, the non-matching events are tagged and sent to the undo unit 270. Alternatively, if the number non-matching events are greater than a threshold, then the non-matching events are tagged and sent to the undo unit 270.

As discussed above, when the comparison unit 260 identifies an incorrect past prediction, the undo unit 270 "undoes" the effects of the screen updates since the incorrect prediction. Several algorithms for the undo unit 270 are contemplated.

The undo unit 270 may execute an undo logging approach. In the undo logging approach, the pixels that will be overwritten by the update are logged. A sequence of incorrectly predicted events may then be undone by walking the log in reverse order.

The undo unit 270 may execute a redo logging approach. In the redo logging approach, the events that have been correctly played are logged. When a predicted event that has been played is proven to be incorrect, the log of correct events is replayed. In general, this approach may terminate in the correct display if the redo log is long enough, having captured the activity in the same region overwritten by the incorrect event. A shorter redo log may be used, however, as a trade off between the correctness of the display and the amount of memory used. In addition, the redo log may only need to record and play back events that the system knows about. In contrast, undo logging implements "undo" analogs for each of the events.

The undo unit 270 may execute a server request approach. In this approach, when an incorrect prediction is identified by the comparison unit 260, the client 210 requests a new copy of the entire screen from the server 220. The undo unit can request the entire screen from the server, or it can request a portion of the screen. For example, if the undo unit 270 can determine what portion of the screen is incorrect, the undo unit 270 may request the incorrect portion.

The undo unit 270 may execute a periodic update approach. In this approach, the client 210 requests a copy of the screen from the server 220 at periodic intervals. In such a manner, the screen is generally correct at least at the periodic intervals and requires minimal state on the client 210. Alternatively, the client 210 may cache a local snapshot of the local screen when it is known to be correct.

The undo unit 270 may execute a check pointing approach. In this approach, the periodic updates and redo logging are integrated together. When an incorrect event is detected by the comparison unit 260, the undo unit 270 rolls back to the most recent periodic screen update and then play the redo log. This approach shrinks the redo log memory requirements.

The undo unit 270 may execute an ostrich approach. In this approach, when an incorrect event is detected by the comparison unit 260, the undo unit 270 identifies on the screen the incorrect regions. For example, the undo unit may draw an alpha mask over the corresponding region of the screen. In another embodiment, the undo unit 270 may alter the color of the incorrect region, for example. Any technique to indicate to the user that the region is incorrect may be used. An indication of an error may stimulate the user to activate a screen update. The undo unit 270 may use any of the above approaches.

The above system 200 allows a client to predict future server events and draw on the future server events on the screen. If the future server events are correctly predicted, the round trip time between the client 210 and the sever 220 is irrelevant. If the predictions are falsified by the eventual arrival of server-supplied server events, the effects of the incorrectly predicted server events may be corrected by the undo unit 270. In an embodiment, the process of predicting the server events and correcting the incorrectly predicted server events happens continuously. The effect is a client unit 210 and display unit 270 that are responsive, but is occasionally temporarily incorrect for short periods before returning to correctness. The user may choose how aggressive the predictions are, trading off between responsiveness and the temporary display artifacts due to incorrect predictions. In an embodiment, the user may control the number of future server events that are predicted and the threshold of likelihood of a predicted server event before the server event is drawn on the screen.

Figure 3:
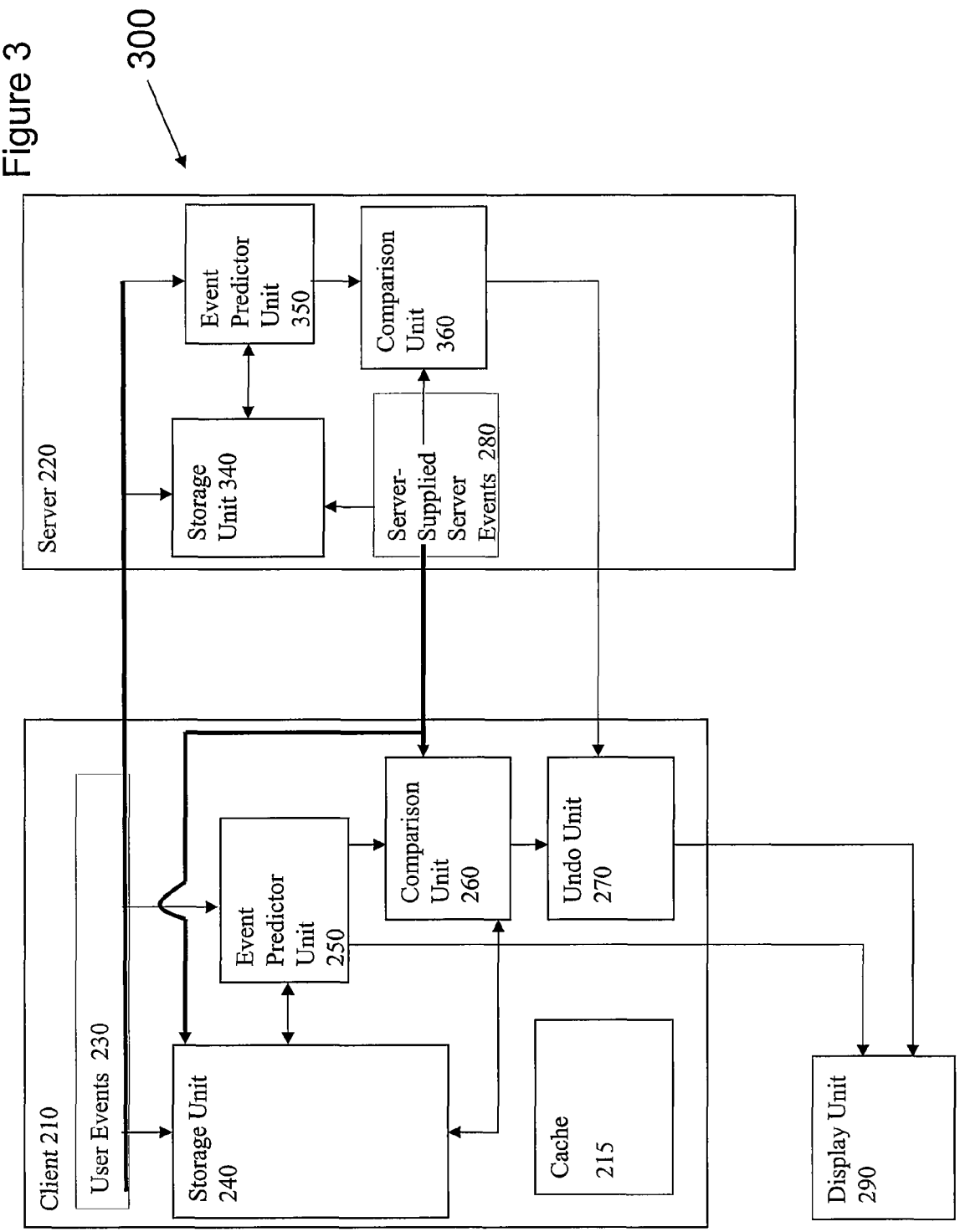
FIG. 3 illustrates a remote display system that may be used in accordance with an embodiment of the present invention.

FIG. 3 illustrates a system 300 in accordance with an embodiment of the present invention. FIG. 3 is a variation of the system 200. The server in FIG. 3 is executing a mirror copy of the software being executed on the client. In an embodiment, the user events 230 to a storage unit 340 and event predictor unit 350. The storage unit 340 and event predictor unit 350 may be substantially similar to the storage unit 240 and event predictor unit 250 on the client. The comparison unit 360 may receive as input the predicted server events as well as the server-supplied server events. The comparison unit 360 may be substantially similar to the comparison unit 260 on the client. In an embodiment, the comparison unit 260 and comparison unit 360 should generate the same output. In such a manner, the server 220 may monitor the correctness of the event prediction unit 260. When an error is identified by the server 220, the server 220 may send a signal to the undo unit 270. The undo unit 270 may then take appropriate action to correct the errors. In an embodiment, because the server 220 is monitoring the correctness of the event prediction unit 260 by independently computing the same predicted server events, the server 220 only transmits a server-supplied event if the server 220 detects an incorrect predicted server event. In such a manner, bandwidth between the client 210 and the server 220 may be conserved.

Figure 4:
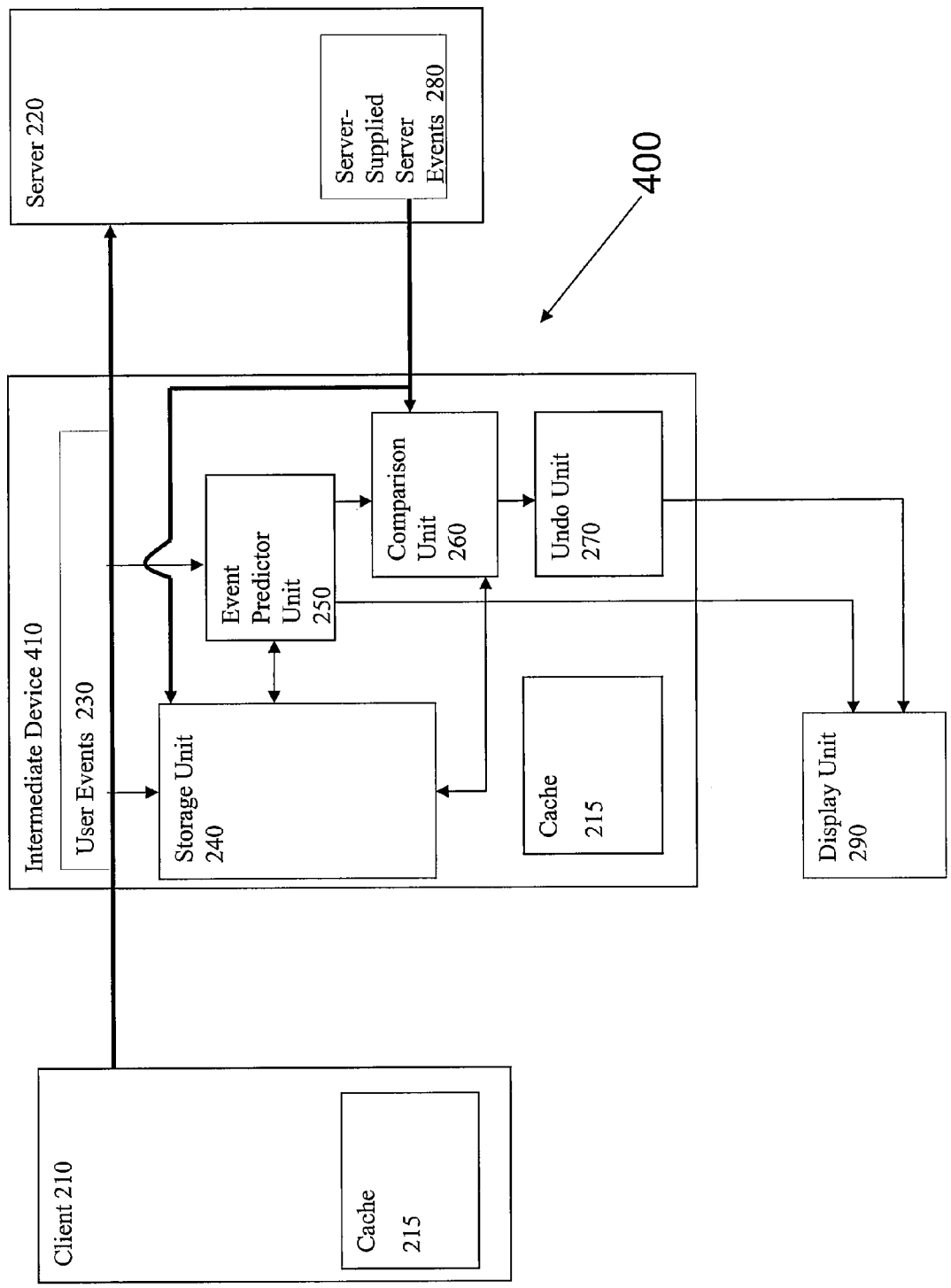
FIG. 4 illustrates a remote display system that may be used in accordance with an embodiment of the present invention.

FIG. 4 illustrates a system 400 in accordance with an embodiment of the present invention. FIG. 4 is a variation of the system 200. In FIG. 4, the client 210 is unmodified and the server 220 is unmodified from typical remote display systems. The intermediate device 410 is connected to both the client 210 and the server 220. The intermediate device includes the componentry detailed with respect to the system 200. The client 210 sends user events 230 to the intermediate device 410. The user events 230 are processed at the intermediate device 410 and also sent to the server 220.

FIG. 5 illustrates a method 500 for network computing in accordance with an embodiment of the present invention. At step 510, historical user events and historical server events are stored. In an embodiment, user events may include input from a keyboard, computer mouse, or other input device for a computer. The server events may include drawing commands, bitmaps, color tables, blit operations, ordering operations, or other display commands. The historical user events, historical server events, predicted user events and predicted server events may be stored at step 510.

At step 520, a current user event is received. The user event, as described above, may include input from a keyboard, computer mouse, or other input device for a computer. A current user event is a user event that has occurred in real-time or near real-time and has not yet caused a screen update. For example, a current user event may include the navigation of a computer mouse and a click one of the computer mouse buttons. In an embodiment, the results of the current user event have not yet been displayed on the screen.

At step 530, a predicted server event may be generated. One or more predicted server events may be generated by the client based on the current user event and the relation of the historical user events and the historical server-supplied server events and/or the predicted server events, or some combination thereof. In an embodiment, the predicted server event may be generated by a prediction algorithm. In an embodiment, the prediction algorithm may utilize a k-th order state-space-limited Markov model that is continuously trained. The symbols that the Markov model may utilize are the current user events supplied as human-readable strings. A typical current user event, such as computer mouse movement, contains the type of event, for example, mouse movement and its parameters, for example (x, y) coordinates.

Other prediction models may be used. For example, semantics-free predictors that operate on strings without any knowledge of content may be used. For example, a genetic programming model may be used. In addition, semantic-exploiting predictors that take advantage of content may be used. For example, a Markov model may be used to predict the type of event, for example to draw a bit map operation. A linear model, such as Box-Jenkins or nonlinear model, such as Tong, may be used to predict the event parameters, for example the coordinates at which the bitmap should be drawn.

At step 540, a screen update may be executed. The screen update may be based on the one or more predicted server events that are generated at step 530. In an embodiment, the screen update may be executed prior to receiving the server-supplied server events for the current user events. In such a manner, the screen may be updated faster than if the screen update waited for the server-supplied server events.

At step 550, the one or more server-supplied server events are received. In general, one or more server-supplied server events are generated by a server in response to a triggering event. In an embodiment, the triggering event may be a current user event. Alternatively, the triggering event may be a predetermined interval of time. In another alternative, the triggering event may be an arrival of a server-supplied server event.

Once received, the one or more server-supplied server events are sent by a server over a network to a client. In general, the timing of the receipt of the server-supplied screen update depends on the conditions of the network that connects the client and server. For example, if the client and server are connected over a wide-area-network, or other network with high average or high variance round-trip times, the server-supplied screen update may be received after the execution of the screen update at step 540.

At step 560, the server-supplied server event that is received at step 550 is compared with the predicted server event that is generated at step 530. In an embodiment, if the predicted server event does not match the server-supplied server event, an undo algorithm is executed. Alternatively, if the difference between the predicted server event and the server-supplied server event is greater than a threshold value, an undo algorithm is executed. The user may control the degree of responsiveness of the client by selecting an acceptable level of incorrect predictions. In general, the higher the level of incorrect predictions the user is willing to accept, the more responsive the system will be.

At step 570, the incorrectly predicted events that are identified at step 560 are undone. In an embodiment, all incorrectly predicted events are undone. Alternatively, less than all incorrectly predicted events are undone. A user may control the degree of responsiveness. Several algorithms are contemplated to undo the incorrectly predicted events.

An undo logging approach may be used. In the undo logging approach, the pixels that will be overwritten by the update are logged. A sequence of incorrectly predicted events may then be undone by walking the log in reverse order.

A redo logging approach may be used. In the redo logging approach, the events that have been correctly played are logged. When a predicted event that has been played is proven to be incorrect, the log of correct events is replayed. In general, this approach may terminate in the correct display if the redo log is long enough, having captured the activity in the same region overwritten by the incorrect event. A shorter redo log may be used, however, as a trade off between the correctness of the display and the amount of memory used. In addition, the redo log may only need to record and play back events that the system knows about. In contrast, undo logging implements "undo" analogs for each of the events.

A server request approach may be used. In this approach, when an incorrect prediction is identified, the client requests a new copy of a portion of or the entire screen from the server.

A periodic update approach may be used. In this approach, the client requests a copy of the screen from the server at periodic intervals. In such a manner, the screen is generally correct at least at the periodic intervals and requires minimal state on the client. Alternatively, the client may cache a local snapshot of the local screen when it is known to be correct.

A check pointing approach may be used. In this approach, the periodic updates and redo logging are integrated together. When an incorrect event is detected, the undo algorithm rolls back to the most recent periodic screen update and then plays the redo log. This approach shrinks the redo log memory requirements.

An ostrich approach may be used. In this approach, when an incorrect event is detected, the undo algorithm identifies on the screen the incorrect regions. For example, the undo unit may draw an alpha mask over the corresponding region of the screen. In another embodiment, the color of the incorrect region on the screen may be altered, for example. Any technique to indicate to the user that the region is incorrect may be used. An indication of an error may stimulate the user to activate a screen update.

The systems 200-400 and method 500 described above may be carried out as part of a computer-readable storage medium including a set of instructions for a computer. The set of instructions may include a storage routine for storing historical user events and historical server events. In an embodiment, user events may include input from a keyboard, computer mouse, or other input device for a computer. The server events may include drawing commands, bitmaps, color tables, blit operations, ordering operations, or other display commands.

The set of instructions may also include a receiving routine for receiving a current user event. The user event, as described above, may include input from a keyboard, computer mouse, or other input device for a computer. A current user event is a user event that has occurred in real-time or near real-time and has not yet caused a screen update. For example, a current user event may include the navigation of a computer mouse and a click one of the computer mouse buttons. In an embodiment, the results of the current user event have not yet been displayed on the screen.

The set of instructions may also include a generating routine for generating a predicted server event. The predicted server event may be generated by the client based on the current user event and the relation of the historical user events and the historical server-supplied server events and/or the predicted server events, or some combination thereof. The generating routine may receive as inputs, historical user events, historical server-supplied server events, and/or historical predicted server events.

In an embodiment, the predicted server event may be generated by a prediction algorithm. In an embodiment, the prediction algorithm may utilize a k-th order state-space-limited Markov model that is continuously trained. The symbols that the Markov model may utilize are the current user events supplied as human-readable strings. A typical current user event, such as computer mouse movement, contains the type of event, for example, mouse movement and its parameters, for example (x, y) coordinates.

Other prediction models may be used. For example, semantics-free predictors that operate on strings without any knowledge of content may be used. For example, a genetic programming model may be used. In addition, semantic-exploiting predictors that take advantage of content may be used. For example, a Markov model may be used to predict the type of event, for example to draw a bit map operation. A linear model, such as Box-Jenkins or nonlinear model, such as Tong, may be used to predict the event parameters, for example the coordinates at which the bitmap should be drawn.

The set of instructions may also include an execution routine for executing a screen update based on the predicted server event. The screen update may be based on the predicted server event. In an embodiment, the screen update may be executed prior to receiving the server-supplied server events for the current user events. In such a manner, the screen may be updated faster than if the screen update waited for the server-supplied server events.

The set of instructions may also include a receipt routine for receiving a server-supplied server event. In general, the server-supplied server event is generated by a server in response to the current user event. The server-supplied server event is sent by a server over a network to a client. In general, the timing of the receipt of the server-supplied screen update depends on the conditions of the network that connects the client and server. For example, if the client and server are connected over a wide-area-network, or other network with high average or high variance round-trip times, the server-supplied screen update may be received after the execution of the screen update.

The set of instructions may also include a comparison routine for comparing the predicted server event with the server-supplied server event. In an embodiment, if the predicted server event does not match the server-supplied server event, an undo algorithm routine is executed. Alternatively, if the difference between the predicted server event and the server-supplied server event is greater than a threshold value, an undo algorithm routine is executed. The user may control the degree of responsiveness of the client by selecting an acceptable level of incorrect predictions. In general, the higher the level of incorrect predictions the user is willing to accept, the more responsive the system will be.

The set of instructions may also include an undo algorithm routine for undoing the incorrectly predicted events that are identified in the comparison routine. In an embodiment, all incorrectly predicted events are undone. Alternatively, less than all incorrectly predicted events are undone. A user may control the degree of responsiveness. Several undo algorithm routines are contemplated to undo the incorrectly predicted events An undo logging routine may be used. In the undo logging approach, the pixels that will be overwritten by the update are logged. A sequence of incorrectly predicted events may then be undone by walking the log in reverse order.

A redo logging routine may be used. In the redo logging approach, the events that have been correctly played are logged. When a predicted event that has been played is proven to be incorrect, the log of correct events is replayed. In general, this approach may terminate in the correct display if the redo log is long enough, having captured the activity in the same region overwritten by the incorrect event. A shorter redo log may be used, however, as a trade off between the correctness of the display and the amount of memory used. In addition, the redo log may only need to record and play back events that the system knows about. In contrast, undo logging implements "undo" analogs for each of the events.

A server request routine may be used. In this approach, when an incorrect prediction is identified, the client requests a new copy of the entire screen from the server.

A periodic update routine may be used. In this approach, the client requests a copy of the screen from the server at periodic intervals. In such a manner, the screen is generally correct at least at the periodic intervals and requires minimal state on the client. Alternatively, the client may cache a local snapshot of the local screen when it is known to be correct.

A check pointing routine may be used. In this approach, the periodic updates and redo logging are integrated together. When an incorrect event is detected, the undo algorithm rolls back to the most recent periodic screen update and then plays the redo log. This approach shrinks the redo log memory requirements.

An ostrich routine may be used. In this approach, for example, the undo unit may draw an alpha mask over the corresponding region of the screen. In another embodiment, the color of the incorrect region on the screen may be altered, for example. Any technique to indicate to the user that the region is incorrect may be used. An indication of an error may stimulate the user to activate a screen update.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A system for network computing, said system comprising:
    a storage unit for that archives historical user events generated by a client and historical server events generated by a server;
    a processing unit that receives a current user event generated by the client and that generates one or more predicted server events based on the current user event, wherein said processing unit executes a screen update on a display based on said one or more predicted server events to avoid a round-trip network delay from the server, wherein the current user event is sent to the server, wherein the server remotely controls the display with server-supplied graphics primitives; and
    a comparison unit having computer software that compares said one or more predicted server events with one or more server-supplied server events, wherein at least one server-supplied server event is subject to the round-trip network delay, wherein said one or more server-supplied server events are generated based on a triggering event.

2. The system of claim 1, wherein said triggering event is said current user event.

3. The system of claim 1, wherein said triggering event is a predetermined interval of time.

4. The system of claim 1, wherein said triggering event is an arrival of a server-supplied server event.

5. The system of claim 1, further comprising an undo unit, wherein if there is a difference between said one or more predicted server events and said one or more server-supplied server events, an undo unit having computer software for executing an undo algorithm alters the non-matching events to match the server-supplied server event.

6. The system of claim 1, further comprising an undo unit, wherein if the difference between said one or more predicted server events and said one or more server-supplied server events is greater than a threshold value, an undo unit having computer software for executing an undo algorithm alters the non-matching events to match the server-supplied server event.

7. The system of claim 1, wherein said storage unit, said processing unit, and said comparison unit are located in an intermediate device.

8. The system of claim 1, wherein said storage unit, said processing unit, and said comparison unit are located in a client.

9. The system of claim 8, wherein a mirror storage unit, mirror processing unit, and mirror comparison unit are located in a server, wherein said server transmits to said client error correction information.

10. A method for network computing, said method comprising:
    storing historical user events generated by a client and historical server events generated by a server;
    receiving a current user event generated by the client;
    generating one or more predicted server events;
    sending the current user event to the server;
    executing a screen update on a display based on said one or more predicted server events to avoid a round-trip network delay from the server, wherein the current user event is sent to the server, wherein the server controls the display with server-supplied graphics primitives;
    comparing said one or more predicted server events with one or more server-supplied server events, wherein at least one of the server-supplied server events is subject to the round-trip network delay, wherein said one or more server-supplied server events are generated based on a triggering event; and
    undoing one or more of said predicted server events executed as part of said screen update using an undo algorithm if one or more of said predicted server events is different than said one or more server-supplied server events.

11. The method of claim 10, wherein said triggering event is said current user event.

12. The method of claim 10, wherein said triggering event is a predetermined interval of time.

13. The method of claim 10, wherein said triggering event is an arrival of a server-supplied server event.

14. The method of claim 10, wherein said one or more predicted server events are generated according to one or more of the following: predicted user events, historical user events, historical predicted server events, historical server-supplied server events.

15. The method of claim 10, wherein said undo algorithm is an undo-logging algorithm.

16. The method of claim 10, wherein said undo algorithm is a redo-logging algorithm.

17. The method of claim 10, wherein said undo algorithm requests a refresh of information from a server.

18. The method of claim 17, wherein said undo algorithm requests a refresh of information from a server at periodic intervals for a periodic update.

19. The method of claim 18, wherein said undo algorithm identifies the last periodic update and then executes a redo-logging algorithm.

20. The method of claim 10, wherein said undo algorithm identifies the incorrect region on the display to the user.

21. The method of claim 20, wherein said undo algorithm identifies the incorrect region on the display to the user using an alpha mask.

22. A non-transitory computer readable medium including a set of instructions for execution by a computer, said set of instructions comprising:
- a storage routine that stores historical user events generated by a client and historical server events generated by a server;
- a receiving routine that receives a current user event generated by the client;
- a sending routing that sends the current user event to the server;
- a generating routine that generates one or more predicted server events based on the current user event;
- an execution routine that executes a screen update on a display based on said one or more predicted server events to avoid a round-trip network delay from the server, wherein the server controls the display with server-supplied graphics primitives; and
- a comparison routine that compares said one or more predicted server events with one or more server-supplied server events, wherein at least one of the server-supplied server events is subject to the round-trip network delay, wherein said one or more server-supplied server event is generated based on a triggering event.

23. The set of instructions of claim 22, wherein said triggering event is said current user event.

24. The set of instructions of claim 22, wherein said triggering event is a predetermined interval of time.

25. The set of instructions of claim 22, wherein said triggering event is an arrival of a server-supplied server event.

26. The set of instructions of claim 22, further comprising an undo routine for executing an undo algorithm if said one or more predicted server events is different than said one or more server-supplied server events.

27. The set of instructions of claim 22, wherein said generating routine receives one or more of the following: predicted user events, historical user events, historical predicted server events, historical server-supplied server events.

28. The set of instructions of claim 22, wherein said generating routine is using a k-th order state-space-limited Markov model.

* * * * *

UNITED STATES PATENT AND TRADEMARK OFFICE
CERTIFICATE OF CORRECTION

| | | |
|---|---|---|
| PATENT NO. | : 7,991,831 B2 | Page 1 of 1 |
| APPLICATION NO. | : 11/830553 | |
| DATED | : August 2, 2011 | |
| INVENTOR(S) | : Peter Dinda and Sam Rossoff | |

It is certified that error appears in the above-identified patent and that said Letters Patent is hereby corrected as shown below:

Column 11, line 56 delete "a storage unit for that" and insert --a storage unit that--.

Signed and Sealed this
Third Day of January, 2012

David J. Kappos
*Director of the United States Patent and Trademark Office*